UNITED STATES PATENT OFFICE.

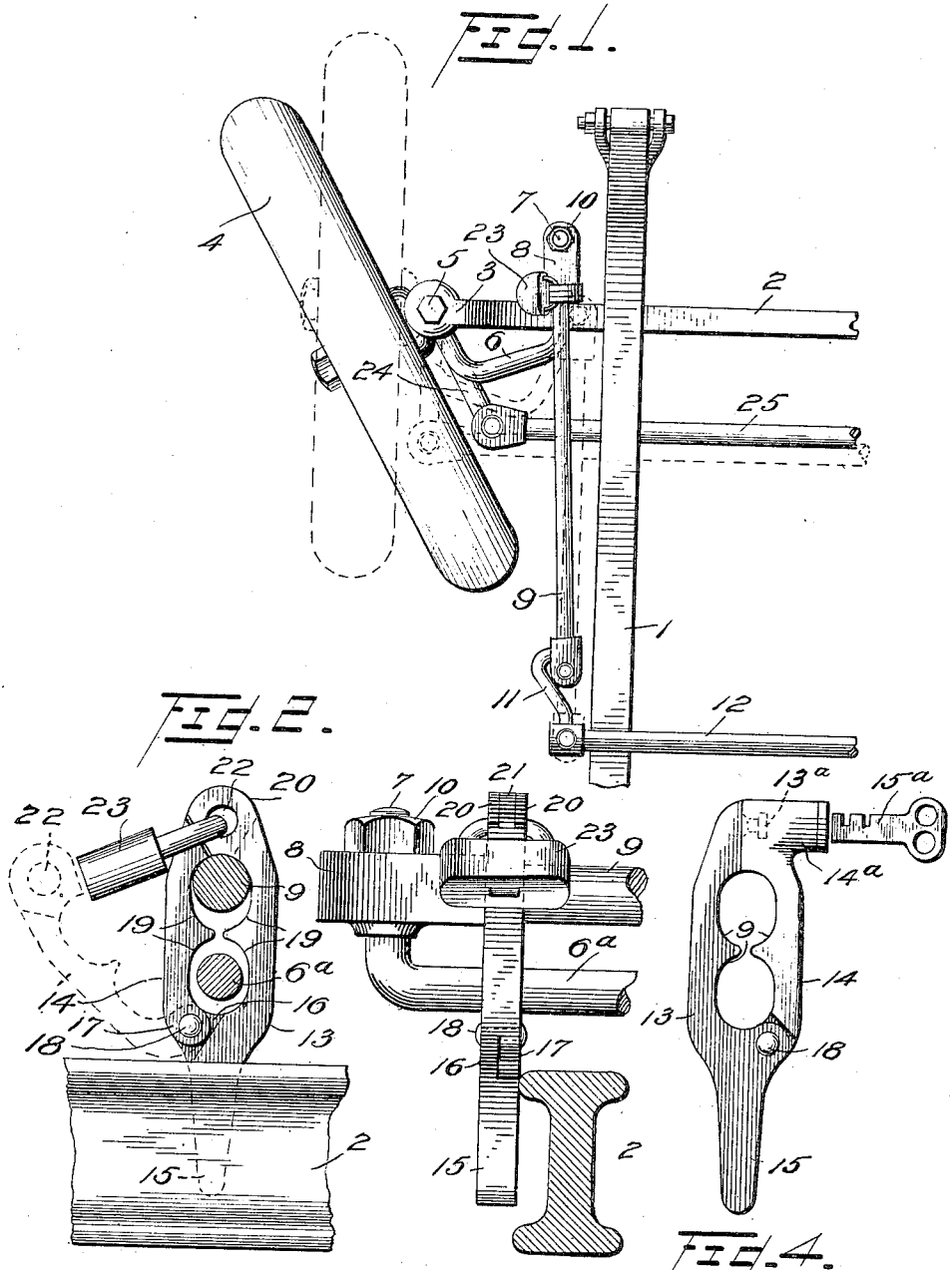

JAMES W. BARWICK, OF PINEPARK, GEORGIA.

AUTOMOBILE-LOCK.

1,375,994. Specification of Letters Patent. Patented Apr. 26, 1921.

Application filed January 15, 1920. Serial No. 351,736.

*To all whom it may concern:*

Be it known that I, JAMES W. BARWICK, a citizen of the United States, residing at Pinepark, in the county of Grady and State of Georgia, have invented a new and useful Automobile-Lock, of which the following is a specification.

This invention relates to locks for automobiles.

The object is to provide means for locking automobiles against use by unauthorized persons, and contemplates the prevention of the turning of the steering mechanism so that the machine is rendered incapable of being steered properly, until the lock is removed.

Another object is to provide locking means which may be cheaply manufactured and sold at a low cost, and that may be readily applied to certain parts of the steering mechanism, such parts being present in the majority of machines now on the market and within easy reach of an operator, and which may be as easily removed from the machine when desired.

A further object is to provide a lock of this class which when properly applied to two relatively movable parts swiveled together will not only prevent their swinging action by such engagement, but is so constructed as to engage against the front axle of the machine in such a manner as to positively prevent any effective movement of the steering wheel and consequently the mechanism connected therewith, and thus lending additional protection against malicious tampering with or unauthorized use of the machine.

A full and complete understanding of the invention may be obtained from a consideration of the following detailed description, taken in connection with the accompanying drawing forming part of this specification, it being understood that while the drawing shows a practical form of the invention, the latter is not confined to strict conformity therewith, but may be changed and modified so long as such changes and modifications mark no material departure from the salient features of the invention, as specifically pointed out in the appended claims.

In the drawing, in which similar reference characters designate corresponding parts throughout the several figures:

Figure 1 is a plan view of a portion of the left hand front and of the frame of an automobile, together with the axle, steering mechanism, and front wheel thereof, showing the improved locking means in position engaging the front axle and holding the wheel in angular relation to the line of movement of the machine;

Fig. 2 is an enlarged detail sectional view looking toward the front of the machine and illustrating the lock in engagement with the members of the steering mechanism and its relation to the front axle;

Fig. 3 is a side elevation of the subject matter of Fig. 2 and showing the axle in cross section;

Fig. 4 is a front elevation of a slightly modified form of the invention.

In order to prevent the numerous robberies of automobiles and the malicious tampering with and handling of the same by unauthorized persons, many schemes have been devised of late, some of which have been put upon the market, but in the majority of cases, the same have been found to be impracticable for the reason that they have proven to be either too complicated and delicately made, thus being easily broken and removed from their position, or that they have permitted, when in locked position, sufficient movement of the parts necessary, as to enable a thief to get away with the car.

The present invention contemplates a device of extremely simple construction, which may be made heavy and strong enough to withstand any attacks which may be made upon it, such as endeavoring to pry the same loose with a jimmy or other tool, or attempting to smash the same by blows with a hammer, etc., the said locking device being so shaped as to offer but little surface for such treatment, and being applied when in use in a particular place on the machine where it is difficult to carry out such malicious acts.

In the drawing that portion of the car which is illustrated in Fig. 1 may be taken as indicative of the construction of the steering mechanism of a majority of automobiles of the present day, the same comprising the frame member 1 of the chassis resting in the usual manner upon the front axle 2, the interposed springs together with other details of construction, however, being, in the present instance, not illustrated.

The axle 2 has the usual enlarged yoke portion 3 at its outer end, within which is swiveled one of the front steering wheels 4, upon the pivotal bolt 5 in the customary manner, the spindle of the wheel 4 being formed integrally with an enlarged member at the inner end thereof, said member being provided with a suitable eye disposed vertically to receive the said pivotal bolt 5.

The angularly bent arm 6, joined integrally with the enlarged member of the wheel spindle, extends to the rear thence inwardly toward the frame member 1, and then forward as indicated at $6^a$, the arm $6^a$ having at its forward end an upturned pivotal post 7, threaded at its terminal and traversing the vertically disposed eye formed in a head 8, which is carried at the front end of a connecting rod 9 having pivotal connection, at its rear end, to the lower end of a curved crank arm 11 mounted on a cross shaft 12 which, in turn, is adapted to be actuated by the hand wheel in a well-known manner.

The parts as thus far described are the usual construction found on the majority of automobiles as now made and form no part of the present invention. The latter is, however, readily applicable to any one of the many cars having the described method of steering incorporated therein. It will be seen, by reference to Fig. 1, that the lock is applied to the parts after the wheel 4 has been turned in the usual manner to its extreme position to turn to the left through the medium of the steering wheel, not shown. This brings the portion $6^a$ of the arm 6 in longitudinal alinement with the connecting rod 9, at the forward end of the latter, when the lock, about to be described, may be readily applied, after which the machine may not be steered in any direction except around in a circle of the shortest possible radius. It is to be understood that the device may also be applied to the right hand side of the machine, when the only direction of travel possible would be in a similar circle around to the right.

The invention comprises a pair of hinged jaws 13 and 14, respectively, of elongated form and composed of some suitable strong metal in the form of castings of sufficient weight and body to withstand the strain to which they may be subjected, in the event an attempt is made to break or separate the same by force.

The jaw 13 is somewhat longer than the jaw 14, having at its lower end a prolongation or extension 15, which may be used as a handle in applying or detaching the device, but which has the primary function of acting as a stop or abutment to strike against the front axle 2, after the device is applied, as will become apparent.

Intermediate of its length, the jaw 13 is provided with an outstanding perforated ear 16, reduced in thickness and adapted to receive, on either side thereof, a pair of similar perforated spaced ears 17 formed at the lower end of the jaw 14, and pivotally connected to the jaw 13 by a rivet 18 which permits the two jaws to be freely opened or closed as desired.

Each jaw is provided, at their opposed faces with a pair of alined depressions or seats 19 which are arranged opposite each other and provide, when the jaws are closed, somewhat elongated oval-shaped passageways for the reception of the members $6^a$ and 9 of the hereinbefore described parts of the automobile structure, and provide ample room for the rods and bars of varying sizes as found on different makes of cars.

The upper ends of the jaws are extended inwardly toward each other, the jaw 13 being bifurcated to provide ears 20, spaced apart to receive the reduced end 21 of the jaw 14, the ears 20 and the said reduced end 21 being provided with apertures 22 for the reception of the shank of an ordinary padlock 23, which may be of any approved make.

In Fig. 4, the overlapping ears having the apertures for the shank of the padlock are omitted, and the jaws 13 may be provided with a projection $13^a$ constituting a locking member to enter and be held in engagement with locking mechanism of any well-known design contained within a barrel-shaped projection $14^a$ carried integrally by the jaw 14 and adapted to be actuated by any suitable key $15^a$.

It should be stated in connection with Fig. 1, that the usual arm indicated at 24 is connected to the vertically disposed eye of the wheel which is mounted on the pivotal bolt 5, and the said arm 24 is pivotally connected in the usual manner, with one end of a connecting rod 25 extending transversely of the machine to actuate the opposite steering wheel in like manner to the wheel already described, all of which is common usage.

From the foregoing it will be seen that an extremely simple, cheaply manufactured, strong and durable automobile locking device has been devised, which is adapted to be applied to various makes of automobiles having provision for the reception of rods, etc., of different sizes, and the same may be readily applied after the steering wheels have been turned to bring the portion $6^a$ of the arms 6 in alinement with the connecting rod 9 in advance of the axle 2, when the lock will lie immediately in rear of the head 8, which acts as a shoulder against the same and the extension or handle 15 will abut against said axle and effectually prevent any turning movement of the steering wheel, as will be readily understood.

What is claimed is:

1. An automobile lock comprising a pair of jaws hinged together at their lower ends to permit the same to be opened or closed, said jaws having seats formed in their opposed faces and adapted, when the jaws are closed to aline for the reception respectively of the steering arm carried by the wheel of an automobile and the actuating rod therefor to prevent the same from having relative movement, said jaws being adapted to be placed upon said arm and rod immediately in rear of their pivotal connection when the wheel is at one limit of its turning movement, one of said jaws having a downwardly extending arm to bear against the front axle, and means for holding the jaws in locked position.

2. In an automobile lock, the combination with the steering arm, the actuating arm therefor, and the front axle of an automobile, of a locking device to be applied after the steering wheel has been turned, consisting of two movable jaws or members having opposed seats to engage with the actuating rod and steering arm, respectively, means for locking the jaws, and a prolongation or extension provided on the locking device to abut against the axle and prevent any turning movement of the steering wheel.

In testimony, that I claim the foregoing as my own I have hereto affixed my signature.

JAMES W. BARWICK.